J. Young
Hanging Circular Saws.

Nº 43,617. Patented July 19, 1864.

Witnesses:

Inventor:
Josiah Young
per Munn & Co
Attorneys

UNITED STATES PATENT OFFICE.

JOSIAH YOUNG, OF BANGOR, MAINE.

IMPROVEMENT IN HANGING CIRCULAR SAWS.

Specification forming part of Letters Patent No. 43,617, dated July 19, 1864.

*To all whom it may concern:*

Be it known that I, JOSIAH YOUNG, of Bangor, in the county of Penobscot and State of Maine, have invented a new and Improved mode of Centering and Securing Circular Saws on their Mandrels; and I do hereby declare that the following is a full, clear, and exact description thereof, which will enable any one skilled in the art to fully understand, construct, and use the same, reference being had to the accompanying drawings, making a part of this specification, in which—

Figure 1:
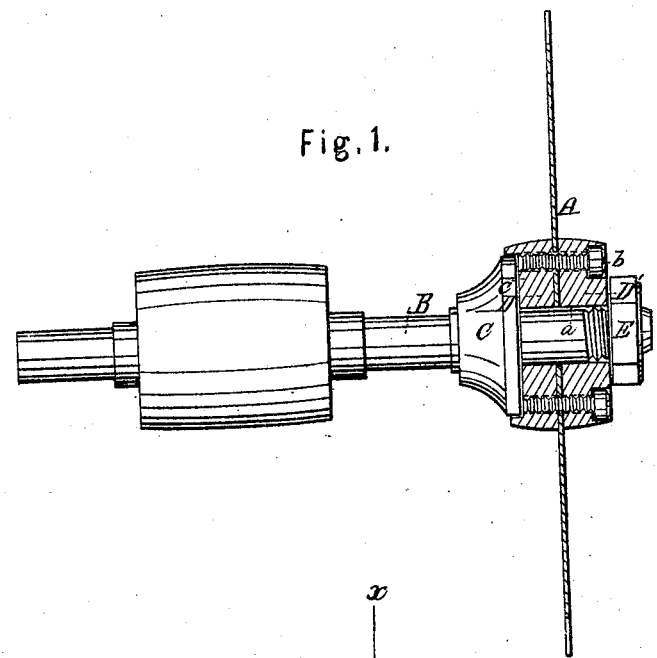
Figure 2:
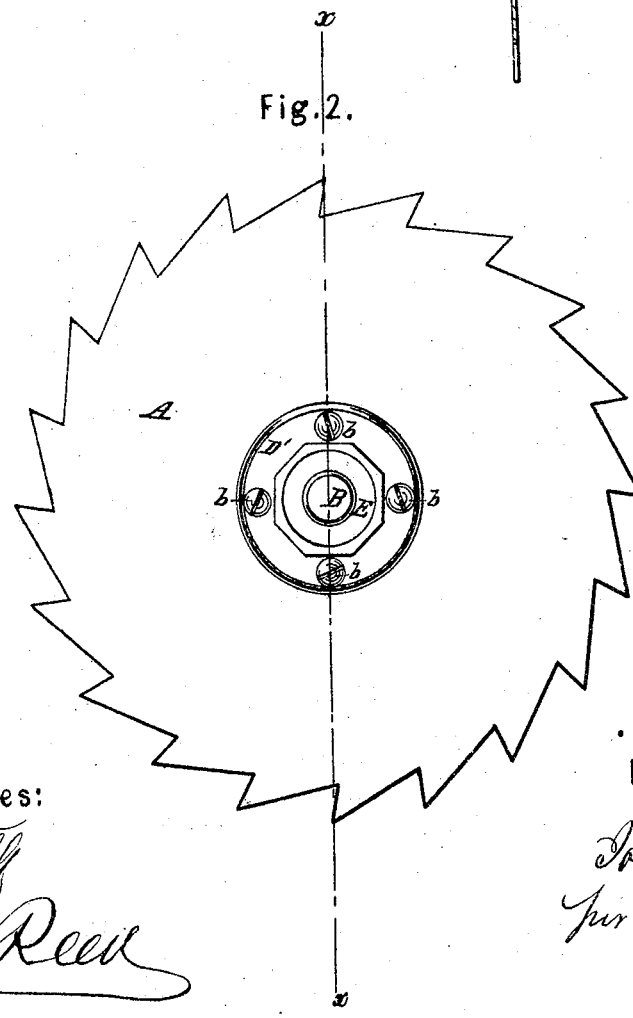

Figure 1 is a sectional view of a saw, taken in the line $x\ x$, Fig. 2, and applied to its mandrel according to my invention. Fig. 2 is a side view of the same.

Similar letters of reference indicate corresponding parts in the two figures.

Circular saws are at present secured on their mandrels by having the former provided with a central hole, through which the mandrel passes snugly in order to center the saw, the latter being secured on the mandrel so as to turn with it by means of a stationary and a screw collar. This arrangement is attended with the difficulty of the "buckling" of the saw, caused by the expansion of the mandrel and the consequent pressure of the same around the hole under the heat conducted to it by the warming of the saw during its cutting operation. To avoid this the aperture at the center of the saw has been made of greater diameter than the mandrel; but this plan, while obviating this difficulty above named, creates one equally as bad—to wit, the impossibility of centering the saw after removing it from the mandrel without facing off the teeth, which occasions considerable trouble and delay and rapidly cuts away the saw.

My invention consists in having the saw provided with two collars, placed one at each side of the saw and secured to it by screws, and having one of said collars provided with a circular concentric recess to fit over a stationary collar on the mandrel, as hereinafter set forth, whereby the saw may at any time be centered on its mandrel and the former provided with a large mandrel-hole, so that the saw will not be in direct contact with the mandrel.

A represents a circular saw, which may be constructed in the usual way, and B is the saw-mandrel, which is smaller in diameter than the hole $a$ at the center of the saw, through which the mandrel passes.

C is a collar, permanent or fixed on the mandrel B, and D D' are two collars, which are secured one to each side of the saw A, and concentric with its mandrel-hole $a$, by means of screws or bolts $b$, as shown clearly in Fig. 1. One of these collars, D, has a circular recess, $c$, made in it to receive the adjoining edge of the permanent collar C on the mandrel, as shown in Fig. 1, and a nut, E, on the mandrel secures the collar D snugly in contact with C and connects the saw to the mandrel. The recess $c$ is made concentrically in the collar D, and as D is concentric with the saw, it follows, as a matter of course, that the saw when adjusted on the mandrel, as above set forth, will be accurately centered in the latter, and the saw at the same time not necessarily be in direct contact with the mandrel, as there is no occasion for the mandrel to fit snugly in the hole. Thus I avoid the difficulty of the straining and buckling of the saw under an expansion of the mandrel, due to the heat conducted to the same by the saw while at work, and at the same time am enabled to remove the saw and adjust the same properly centered upon its mandrel without any difficulty whatever.

I am aware that it is common in securing saws to have one collar fast on the mandrel, and that the saw is frequently fastened to the said collar by means of screws, and clamped by a loose collar and nut. This I do not claim, as it cannot effect the combined purposes of my invention.

Having thus described my invention, what I claim as new, and desire to secure by Letters Patent, is—

1. The permanent collar C on the mandrel B, in combination with the circular concentric recess $c$ in the collar D, attached to the saw A, substantially as and for the purpose set forth.

2. The two collars D D', attached concentrically to the saw A, the concentric recess $c$ in D, the nut E, and permanent collar C on the mandrel, all arranged substantially as and for the purpose specified.

JOSIAH YOUNG.

Witnesses:
JONA. BURBANK,
JAMES R. NICCOLES.